United States Patent
Abadi et al.

(10) Patent No.: US 9,786,007 B2
(45) Date of Patent: Oct. 10, 2017

(54) IDENTIFYING ADDITIONAL VARIABLES FOR APPRAISAL TABLES

(71) Applicant: International Business Machines Corporation, Armonk, NY (US)

(72) Inventors: Aharon Abadi, Eilat (IL); Jonathan Bnayahu, Haifa (IL); Moti Nisenson, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 286 days.

(21) Appl. No.: 13/845,115

(22) Filed: Mar. 18, 2013

(65) Prior Publication Data

US 2014/0278476 A1 Sep. 18, 2014

(51) Int. Cl.
G06Q 40/04 (2012.01)
G06Q 50/22 (2012.01)

(52) U.S. Cl.
CPC ............ G06Q 40/04 (2013.01); G06Q 50/22 (2013.01)

(58) Field of Classification Search
CPC .... G06Q 10/06; G06Q 10/0631; G06Q 10/04; G06Q 10/06375; G06Q 30/0201; G06Q 30/0204; G06Q 40/06; G06Q 50/02; G06Q 40/08; G06Q 10/10; G06Q 40/00; G06Q 50/24; G06Q 10/00; G06Q 30/04; G06Q 50/22; G06F 19/3443; G06F 19/3487

See application file for complete search history.

(56) References Cited

U.S. PATENT DOCUMENTS

| | | | |
|---|---|---|---|
| 7,711,660 B1 | 5/2010 | Gentile et al. | |
| 7,756,772 B1 * | 7/2010 | Konopnicki et al. | 705/37 |
| 8,027,851 B1 | 9/2011 | Krishnan et al. | |
| 8,099,303 B1 | 1/2012 | Battaglia et al. | |
| 8,126,727 B2 | 2/2012 | Peterson | |
| 2006/0015263 A1 * | 1/2006 | Stupp | G06F 17/18 702/19 |
| 2008/0154651 A1 * | 6/2008 | Kenefick et al. | 705/4 |
| 2010/0094766 A1 | 4/2010 | Li et al. | |
| 2011/0107315 A1 | 5/2011 | Bnayahu et al. | |
| 2012/0109839 A1 | 5/2012 | Anderson et al. | |

OTHER PUBLICATIONS

Wojtusiak et al., "Rule-based prediction of medical claims' payments: a method and initial application to medicaid data", 2011 10th International Conference on Machine Learning and Applications and Workshops (ICMLA), vol. 2, pp. 162-167, Dec. 2011.

(Continued)

Primary Examiner — Maroun Kanaan

(57) ABSTRACT

A computerized method of identifying additional influential variables in multi-aspect adjudication frameworks comprising: acquiring an appraisal table having a set of variables affecting at least one adjudication aspect of a multi-aspect adjudication framework; identifying a set of additional variables affecting at least one adjudication aspect of a multi-aspect adjudication framework which fulfills an objective function, said objective function having a plurality of rules, said objective function assessing the compliance of at least one of said appraisal table and said set of additional variables with said plurality of rules; and outputting said set of additional variables.

22 Claims, 5 Drawing Sheets

(56) References Cited

OTHER PUBLICATIONS

Yan et al., "A concept simplification algorithm in insurance database design", 2010 6th International Conference on Advanced Information Management and Service (IMS), pp. 490-493, 2010.
Information Disclosure Statement filed for U.S. Appl. No. 13/423,289 entitled "Generating Policy SummariesFrom Logic Code", Dated Mar. 19, 2012.

\* cited by examiner

US 9,786,007 B2

IDENTIFYING ADDITIONAL VARIABLES FOR APPRAISAL TABLES

BACKGROUND

The present invention, in some embodiments thereof, relates to adjudication platforms and, more specifically, but not exclusively, to methods and systems of identifying additional variables for summaries of multi-aspect adjudication platforms.

Automated and semi-automated adjudication platforms are used in different fields of everyday life, such as banking, actuary and insurance. Banking adjudication platforms may be used to determine customers' commission rates according to variables pertaining to the individual customer, for example overall asset holdings and credit history. In the field of property insurance, adjudication platforms are used to apprise the equitable transfer of the risk of a loss, according to variables such as the situation which led to the damage, monetary value of stolen goods in case of a theft, and/or the like. Adjudication platforms are typically complex, such that decision making in such platforms is performed according to many adjudication platform aspects.

Such multi-aspect adjudication platforms are typically based on a large number of variables, which complicate appraisals of target values such as commission rates in banking or equitable transfer in the field of insurance. Summaries of multi-aspect adjudication platforms, are thereby generated to summarize target values, such that quick appraisal of target values according to a limited number of variables is made possible. Examples of summary types of multi-aspect adjudication platforms include: simplified appraisal tables, text based scenario comparisons, simplified decision trees, simplified benefit rules presentation and/or a combination thereof.

The manual creation of these summaries suffers from several drawbacks. Manual processes are typically slow, costly, error-prone, and difficult to maintain. As policies are renewed, their respective summaries have to be updated accordingly. Previous work demonstrates how, given a set of pre-defined influential variables, summarizing the benefit rules, can be created automatically.

Health insurance policies include a large amount of data of various types and therefore complicated to understand. It is vital for patients to be able to get accurate information regarding coverage provided by their insurance policies. Patients may read through their insurance policy in its entirety, but insurers typically provide shortened summaries of the main sections of each such insurance policy. Such shortened summaries are typically provided in the form of appraisal tables.

Reference is made to FIG. 1, illustrating an exemplary summary table 100 of a pharmaceutical benefit plan, according to some embodiments of the present invention. The pharmaceutical plan yields adjudication target values, such as but not limited to the co-pay result, number of service providers choices such as clinics and/or medical doctors. Each adjudication target value 104 may consist of one or more adjudication aspects, for example the minimal and/or maximal co-pay amount, minimal and/or maximal co-pay percentage from the overall amount paid by an insured member, or the like. The sample refers to two purchase options, also called service types: retail, meaning the drug is purchased at a retail location such as a pharmacy, and mail, meaning that the drug was mailed to the member's address. "Days Supply" refers to the amount of the drug supplied, in terms of the number of days it is supposed to last. The first column 101 applies to a drug purchased in a retail location, in an amount sufficient for at most 30 days. If a larger amount is purchased at a retail location, up to a 60-day supply, the results in the second column 102 apply. Larger amounts are not covered at a retail location. Drugs purchased by mail may include a supply of up to 90 days, and the results displayed in the third column 103 apply. The target values in the table 104 indicate how much a member is to pay for the drug in the given circumstances; this is called the member's co-pay. For example, the value "20%, min $20" indicates the member is to pay 20% of the cost of the drug, but no less than $20 or the actual cost, whichever is lower. Each column of the summary table is called a tier; thus, this policy has three tiers. The number of tiers in each table may vary according to the details of the policy. For example, a 4-tier policy could distinguish between Formulary Generic, Formulary Brand, Non-formulary Generic and Non-formulary Brand tiers. Other policies may have additional tiers for specific groups of drugs; common examples are specialty drugs, high cost drugs, and drugs consumed by means of injection. An exemplary policy having a single tier is called "All". We note that this could be just one part of a larger summary, which may include details such as but not limited to which drugs are covered by an insurance policy and which are not. The specific exemplary example of a "co-pay summary" table in FIG. 1 is one of the more complex parts of the summary which may be extracted from the code which implements the adjudication platform rules.

SUMMARY

According to an aspect of some embodiments of the present invention there is provided a computerized method of identifying additional influential variables in multi-aspect adjudication frameworks comprising: acquiring an appraisal table having a set of variables affecting at least one adjudication aspect of a multi-aspect adjudication framework; identifying a set of additional variables affecting at least one adjudication aspect of a multi-aspect adjudication framework which fulfills an objective function, the objective function having a plurality of rules, the objective function assessing the compliance of at least one of the appraisal table and the set of additional variables with the plurality of rules; and outputting the set of additional variables.

Optionally, the method further comprises acquiring an additional appraisal table and using differentiating between first the appraisal table and the additional appraisal table according to the objective function, using the set of additional variables. Optionally, the method further comprises: identifying data in the appraisal table which is not explained by the set of variables and the set of additional variables; identifying a third set of additional variables affecting at least one adjudication aspect of a the multi-aspect adjudication framework which logically infer identified the data. Optionally, the set of additional variables changes at least one target value in the appraisal table. Optionally, the set of additional variables accounts for at least one difference between a plurality of target values in the appraisal table and wherein the at least one difference is not explained by the set of variables. Optionally, identifying is performed according to a representation of the multi-aspect adjudication framework, the representation comprising of at least one of a plurality of benefit rules and a plurality of formulas for calculating a plurality of adjudication target values in the adjudication framework. Optionally, the method further comprises identifying a set of candidate variables of a multi-aspect adjudication framework, the candidate variables being candidates for the set of additional variables; wherein the set of additional variables is identified from the set of candidate variables. Optionally, identifying is automatically performed. Optionally, identifying comprises at least one control point accepting input from a user, the input modifying the objective function. Optionally, identifying is performed by a simulation, the simulation comprising: generating a plurality of simulation value sets according to the multi-aspect adjudication framework; and executing a summarizing procedure using at least one of the a plurality of simulation value sets. Optionally, the multi-aspect adjudication framework is represented by a plurality of formulas and the generating a plurality of simulation value sets comprises recognizing a major formula of the plurality of formulas. Optionally, the method further comprises identifying a plurality of adjudication platform exceptions to the major formula and wherein the identifying is performed according to the adjudication platform exceptions. Optionally, identifying is performed by at least one of a heuristic and an optimization algorithm. Optionally, the variable in at least one of the set of variables and the set of additional variables are Boolean variables which can be assessed as true-or-false. Optionally, identifying is performed by a satisfiability solver (SAT). Optionally, the method further comprises generating a simplified appraisal table of the multi-aspect adjudication framework according to a summarization procedure and the set of additional variables. Optionally, the method further comprises repeating the identifying a set of additional variables and the generating a simplified appraisal table, iteratively until a stop condition is met. Optionally, the method further comprises receiving a plurality of adjudication variable constraints which restrict the selection of the set of additional variables and wherein the identifying comprises enforcing the adjudication variable constraints. Optionally, at least one of the plurality of adjudication variable constraints is at least one of a desired number of variables in the set of additional variables and a desired financial performance of the appraisal table.

According to an aspect of some embodiments of the present invention there is provided a computer program product for identifying additional influential variables in multi-aspect adjudication frameworks, comprising: a computer readable storage medium; first program instructions to acquire an appraisal table having a set of variables affecting at least one adjudication aspect of a multi-aspect adjudication framework; second program instructions to identify a set of additional variables affecting at least one adjudication aspect of a multi-aspect adjudication framework which fulfills an objective function, the objective function having a plurality of rules, the objective function assessing the compliance of at least one of the appraisal table and the set of additional variables with the plurality of rules; third program instructions to generate a simplified appraisal table of the multi-aspect adjudication framework according to a summarization procedure and the set of additional variables; and fourth program instructions to outputting the set of additional variables wherein the first, second, third and fourth program instructions are stored on the computer readable storage medium.

According to an aspect of some embodiments of the present invention there is provided a system for identifying additional influential variables in multi-aspect adjudication frameworks comprising: a processor; an interface module which acquires an appraisal table having a set of variables affecting at least one adjudication aspect of a multi-aspect adjudication framework, and a representation of the multi-aspect adjudication framework; a calculation module which, using the processor, identifies a set of additional variables affecting at least one adjudication aspect of the multi-aspect adjudication framework and evaluates an objective function which assesses at least one of the appraisal table and the set of additional variables.

Optionally, the calculation module generates a plurality of simulation value sets. Optionally, the interface module acquires a summarizing procedure for summarizing a multi-aspect adjudication framework.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
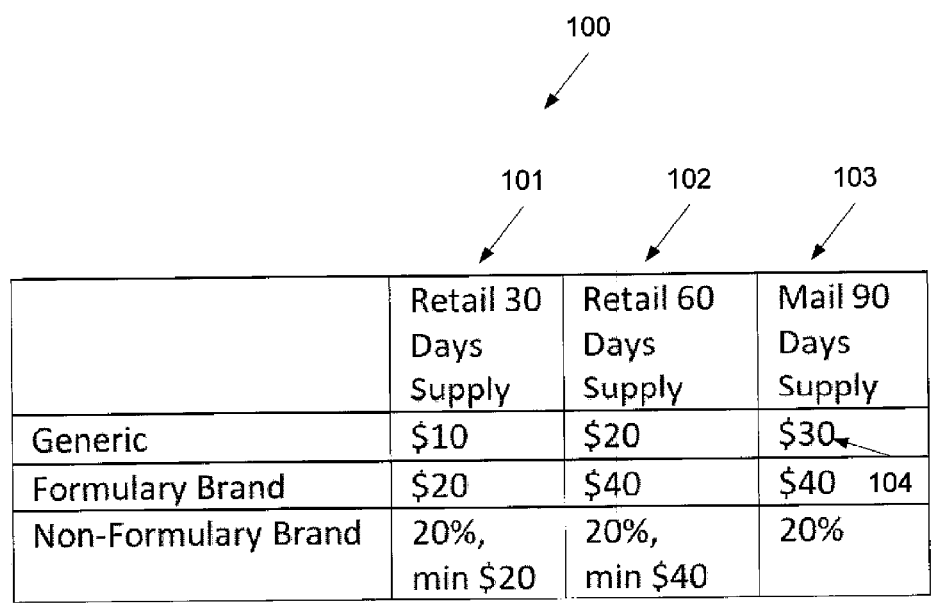
FIG. 1 illustrates an exemplary summary table of a pharmaceutical benefit plan, according to some embodiments of the present invention.

The present invention, in some embodiments thereof, relates to adjudication platforms and, more specifically, but not exclusively, to methods and systems of identifying additional variables for summaries of multi-aspect adjudication platforms.

In addition to providing a valuable service to customers, such summaries of adjudication platforms are quickly becoming a necessity due to recent regulations. For example, the U.S. Patient Protection and Affordable Care Act stipulates that insurers will be required to provide a standardized summary of benefits and coverage to prospective members beginning March, 2012 [8, Sec. 1001, pages 132-135].

Insurers are further required to provide accurate information to their members. Penalties for not providing this information can cost insurers up to $1000 per member; with large insurers having millions of members, this is a serious issue. The scale of the abovementioned challenges is magnified when considering that multiple summaries may be required by different regulations (e.g., state and federal). Summary formats and the information to be included within them may change due to revisions in regulation.

An accuracy level of a healthcare insurance's summary affects its financial performance. Traditional adjudication platforms in healthcare insurance use proprietary languages and methodology for specifying benefit rules. As used herein, the term "benefit rules" means a sub-structure of a multi-aspect adjudication framework representing a relationship between one or more adjudication framework variables and one or more target values. Benefit rules may be in the form of text, pseudo-code, code, logical rules, executable software and the likes. These benefit rules determine coverage extent of payments made by the healthcare program for treatments and procedures according to circumstances and conditions of specific occurrences and incidents. Each subset of candidate variables selected for generating simplified appraisal tables yields different estimation accuracies. As used herein, the term "appraisal table" means a form of adjudication platform summary. The appraisal table provides a reduced number of variables compared to an adjudication platform. The appraisal table allows evaluation of a single adjudication platform and/or comparison between two or more adjudication platforms. Target value estimation precisions are thereby influenced by the selection of variables used in the making of the simplified appraisal table.

The summary of an adjudication platform deliberately ignores many of the details of an insurance claim. Given a set of variables according to which an appraisal table is to be generated an estimated co-pay result for each combination of variables in the table is to be determined. In some cases, there are multiple possible co-pay amounts for each combination of variables values, typically due to the effect of other variables on co-pay results.

According to some embodiments of the present invention, there are provided methods and systems of identifying additional influential variables in multi-aspect adjudication platforms, such that improved adjudication platforms summaries are created. The adjudication platforms summaries may be improved with respect to the financial outcome of the adjudication platform, the accuracy of the summary in relation with the original un-summarized adjudication platform, providing an explanation for difference(s) in target values of adjudication platforms and/or ease of use by a user etc.

Embodiments of the present invention are used to identify a set, a near optimal set and/or an optimal set of influential additional variables used in the process of improving appraisal tables. The set of additional variables is identified from a multitude of candidate variables according to formulas for calculating adjudication target values in the adjudication platform and simplification instructions which define one or more procedures for generating a simplified appraisal table. As used herein, the term "procedure" means a set of instructions for performing a computational task, such as an algorithm, a heuristic, a simulation and/or the likes. The instructions may be provided as pseudo code, code, executable software etc. Each influential variable maps one or more adjudication aspect of a multi-aspect adjudication platform. Influential variables contribute to distinction in simplified appraisal table entries. When an existing simplified appraisal table is re-created according to an updated set of candidate variables which includes a newly introduced influential variable, greater differentiation is achieved in the target value entries of the re-created simplified appraisal table when compared to the target value entries in the original simplified appraisal table.

Embodiments of the present invention further aim to maintain a balance between the numbers of additional variables selected from multitude candidate variables and the clarity, explanatory power and performance of an adjudication platform summary including the additional variables. For example, with an appraisal table type of summary, having co-pay as target values, there is a tradeoff between a reasonably sized modified appraisal table including the additional variables and the modified appraisal table's financial performance and clarity of health benefits. Some embodiments of the system and method may be used to identify exceptions within the adjudication platforms.

According to some embodiments of the present invention, a user effectively and accurately evaluates adjudication aspects of a multi-aspect adjudication platform using modified summaries which include additional variables. A user may further effectively and accurately evaluates adjudication aspects of a multi-aspect adjudication platform compared to known estimation systems. A user may further compare a modified summary of multi-aspect adjudication platform, including additional variables, to summaries of other multi-aspect adjudication platforms, in a more effective and accurate manner.

Embodiments of the methods and systems are demonstrated herein using specific examples of healthcare and pharma-care programs. It should be noted, however, that variations of the present invention may be implemented in a variety of fields, such as actuary calculations, insurance plans, banking commissions or the like.

Figure 2:
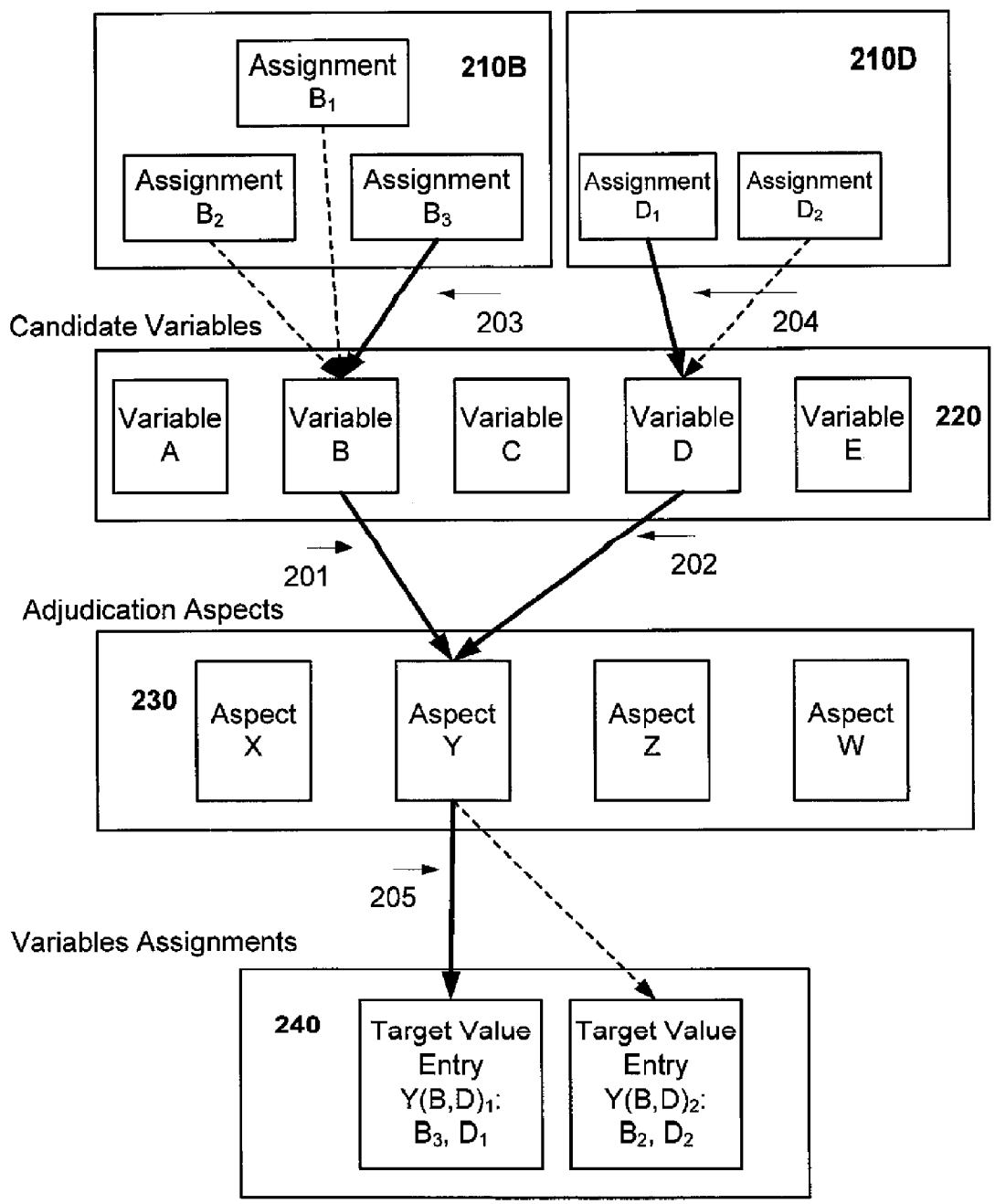
FIG. 2, illustrates a diagram presenting relations between logical elements used in an exemplary procedure of identifying additional variables for improving an appraisal table of an adjudication platform, according to some embodiments of the present invention.

Reference is made to FIG. 2, which illustrates a diagram 200 presenting relations between logical elements used in an exemplary procedure of identifying additional variables for improving an appraisal table of an adjudication platform, according to some embodiments of the present invention. In the exemplary embodiment of FIG. 2, a set of five candidate variables A, B, C, D, and E is denoted as 220. The additional variables may be identified from the set of candidate variables 220 of a multi-aspect adjudication framework. A set of four adjudication aspects X, Y, Z, and W are denoted 230. Numerals 210E and 210D denote potential value assignments for two candidate variables B and D. Exemplary target values for adjudication aspect Y are denoted 240. As shown in numerals 201 and 202, candidate variables B and D affect adjudication aspect Y. $Y(B,D)_1$ and $Y(B,D)_2$ denote exemplary target values for adjudication aspect Y according to two different value assignments denoted $(B,D)_1$ and $(B,D)_2$ respectively. Numeral 203 denotes value assignment $B_3$ to candidate variable B, numeral 204 denotes value assignment $D_1$ to candidate variable D, and numeral 205 denotes an exemplary target value entry $Y(B,D)_1$: $B_3$, $D_1$ which may be generated according to original adjudication platform and/or according to simplification instructions when value $B_3$ is assigned to candidate variable B and value $D_1$ is assigned to candidate variable D.

According to some embodiments of the present invention, candidate variables may be implemented as elements other than Boolean variables, but encoded using Boolean variables. Encoding candidate variables as Boolean may depend on the candidate variable type. For example, the candidate variable "Days Supply" of type integer value may be implemented only for specific ranges of integer values which are relevant to the policy. The candidate variable "days-supply" may be encoded using five Boolean variables corresponding to the ranges [0; 5], [0; 10], [0; 15], [0; 20], [0; 25]], [0; 30]. Each such integer value range may be represented by the Boolean predicates "DS≤5", "DS≤10" and so on respectively, where DS denotes "Days Supply".

Using the above mentioned Boolean variables, the adjudication platform may be described as a sequence of rules, each of which contains a logical condition and a corresponding outcome. In such an embodiment, the last condition of any policy is true, so that an outcome is always defined. Like many other adjudication platforms, the logical conditions break down policy implementation to sequential stages. For example, one stage may validate the input variables, another stage may check whether the member needs prior authorizations from the insurance company for the supply of costly drugs, a different stage may calculate how much the member is to pay, and a fourth stage may apply various limits, such as the member's maximum out-of-pocket payments for the year.

Optionally, the multi-aspect adjudication framework to which the above mentioned logical elements belong is represented by a benefit rules and/or by formulas for calculating adjudication target values in the adjudication framework.

Figure 3:
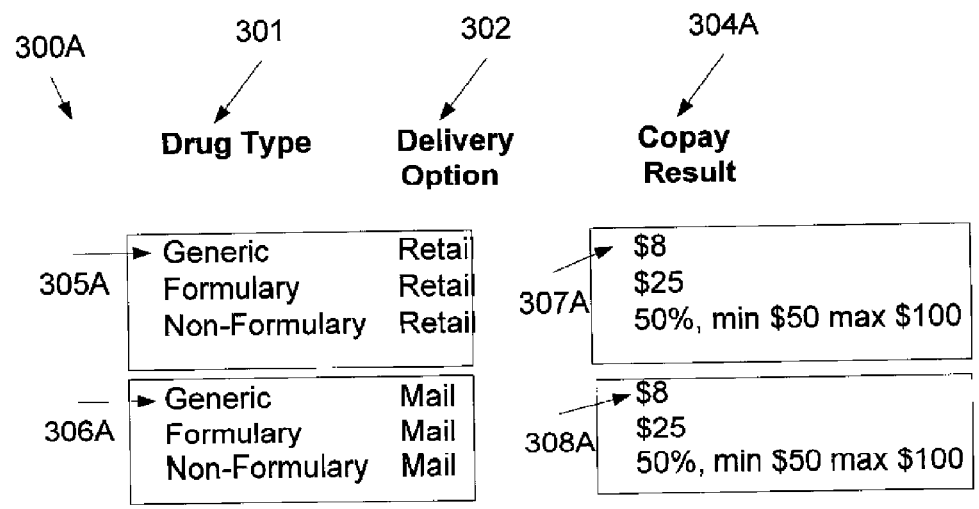
FIG. 3 displays exemplary co-pay appraisal tables 300B and 300A which are generated for a pharmaceutical benefit plan with and without additional influential variables respectively, according to some embodiments of the present invention.
Figure 3:
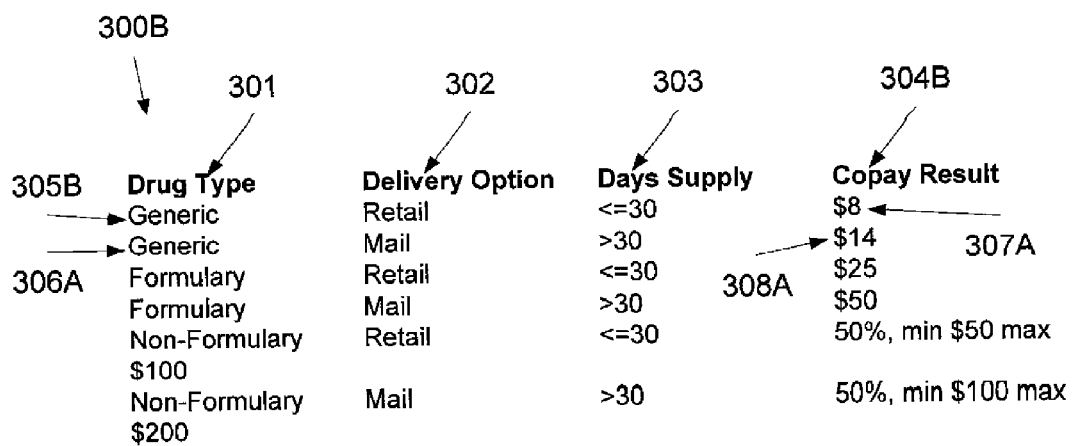

Reference is made to FIG. 3, which displays exemplary co-pay appraisal tables 300B and 300A which are generated for a pharmaceutical benefit plan with and without additional influential variables respectively, according to some embodiments of the present invention. In this exemplary embodiment the pharmaceutical benefit plan uses candidate variables such as "Drug Type" and "Delivery Options" which appear in the abovementioned appraisal tables 300A and 300B as columns 301 and 302 respectively. The adjudication target values are the "co-pay results" shown in columns 304A and 304B. As shown in column 301, value assignments for the candidate variable "Drug Type" may be Generic, Formulary, or Non-Formulary. Column 302 demonstrates value assignments of "Retail" or "Mail" for the candidate variable "Delivery Options". Table 300A demonstrates two different value assignments 305A and 306A for candidate variables "Drug Type" 301 and "Delivery Options" 302. These value assignments are mapped to identical co-pay result values, shown in column 304A and marked as 307A and 308A. Embodiments of the system and method are used to identify additional variables from the candidate variables, denoted herein as "influential variables", which create a differentiation between 307A and 308A. The addition of these influential variables captures missing details of the adjudication platform when a simplified appraisal table is generated which includes the additional influential variables. In the input appraisal table 300A the co-pay result 304A target values of two scenarios are the same: generic drugs delivered by retail drugs 305A and generic drugs delivered by mail 306A both require a co-pay of $8 307A, 308A. This may render the appraisal table as not detailed enough. Such asn as an appraisal table may be improved by including a set of additional variables capturing the missing data. According to one aspect of the present invention, this data is identified as potentially not explained solely by the current set of variables 301, 302. An additional variable 303 may be required to generated a more accurate picture of the co-pay result 304 and/or the reasons for it 303.

The variable "Days Supply" 303 is identified as an influential variable, from a set of candidate variables (not shown). The variable "Days Supply" 303 is chosen as an additional variable. Column 303, demonstrates value assignments for the additional variable "Days Supply" as ranges which indicate the number of days for which a drug must be supplied. The variable "Days Supply" 303 is chosen for at least two reasons: 1) It is an explanatory variable because it supports the explanation regarding the difference between 305A and 306A 2) It is an influential variable because greater differentiation is achieved in the adjudication target values indicated in column 304B of table 300B than those indicated in column 304A of table 300A (as in lines 306A comparing to line 306B). Evidently, a more detailed summary is received in a simplified appraisal table when the influential variable "Days Supply" 303 is introduced. The appraisal table 300B containing the additional variable 303 may have an improved financial outcome as the co-pay results of 304B are all higher than the co-pay results of 304A.

Optionally, one of more additional variables account for difference(s) between target values in an appraisal table, in which the difference(s) cannot be explained by a set of variables without the additional variable(s). Optionally, two or more appraisal tables are acquired. A set of additional variables is identified in order to differentiate between the appraisal tables according to an objective function. As used herein, the term "objective function" means expressing a desired goal, such as a business goal, in mathematical terms. The objective function expresses given conditions for a system, which one seeks to minimize or maximize subject to given constraints. For example, an equation with variables, to be optimized given certain constrains. One exemplary way to evaluate an objective function is by applying non-linear programming techniques. For example, Ta and Tb are two appraisal tables. The variables of Ta are denoted A1, A2, A3 . . . Ai and the variables of Tb are denoted B1, B2, B3 . . . Bj. The overall performance result of each appraisal table is determined according to all target values of that appraisal table. The overall performance may be a simple summation of all target values, weighted averages and/or formula based calculations. The overall performance result of Ta is equal to the overall performance result of Tb. For each appraisal table, Ta and Tb, a set of potentially interesting variables and value assignments is chosen from the set of candidate variables and their language. A set of additional variables are identified for each table, such that the modified tables Ta' and Tb', which include the additional variables are different with respect to the overall performance result. The set of additional variables is optionally the minimum number of additional variables which fulfill that criterion.

Optionally, the additional variables are identified using domain specific knowledge. As typically it is not feasible to scan all candidate variable combinations and their value assignments, methods which increase the chances of finding a satisfying solution with reasonable time and computation resources are applied. Such methods comprise space exploration heuristics and optimization algorithms such as Monte Carlo, Genetic algorithms and the likes. One such method is using domain specific knowledge. The candidate variables are ranked by their importance based on prior knowledge about the variables. The candidates may be divided into sub-groups increasing in size based on domain knowledge: adding more and more candidate variable of decreasing ranks.

Identification of additional variables for improving adjudication summaries may be limited in practice by constraints. The procedure for identifying the additional variables may be limited due to various reasons such as performance and/or desired properties of an adjudication platform summary: It is often impractical to examine all possible assignment combinations for all variables, and constraints are helpful in limiting the assignments to practical calculations. The adjudication variable constraints are enforced to restrict the selection of the additional variables and/or their assignment value ranges.

An analysis reveals that the primary factors which affect performance are the number of formulas in the input adjudication platforms and the number of value assignments that need to be tested, which are directly affected by the size of the subset of target variables selected from the candidate variables. The appraisal table size, for example, is often limited by constraints for clarity reasons. Usage of too many candidate variables in the procedure for generating a simplified appraisal table for the adjudication platform results in an enormous appraisal table which would not be a useful simplification of the health insurance policies. At its extreme, adding all variables would give the entire policy which is not a helpful summary. The adjudication variable constraints, which restrict the selection of said set of additional variables, may be received from an external source such as a file, a link to a file and/or provided by a user.

Reference is now made to an exemplary implementation of selecting candidate variables and identifying additional variables among them, as described above. Two appraisal tables, having the same most general result, may be different from one another with respect to influential variables, values of influential variables, referred to herein also as influential values, non-influential variables and/or values of non-influential variables, referred to herein also as non-influential values. These are detailed in Table 1. In order to differentiate between the two appraisal tables by some objective function, for example based on their most general result, additional influential variables may identified, values of existing and/or additional influential variables may be identified. Difference in non-influential variables and/or non-influential values between the two appraisal tables may lead to different extensions of these tables. Different non-influential variables and/or values may lead to a different set of candidate variables and respective values, from which the additional variables and their values is selected.

TABLE 1

Optional differences between two appraisal tables, having the same most general result

| Influential Variables | Influential Values | Non Influential Variables | Non Influential Values |
|---|---|---|---|
| Same | Different | Same | Same |
| Same | Different | Different | Irrelevant |
| Different | Irrelevant | Same | Same |
| Different | Irrelevant | Same | Different |
| Different | Irrelevant | Different | Irrelevant |

For clarity the rest of this embodiment refers mostly to the case of identifying influential additional variables for two assignments of the same appraisal table. A given appraisal table has two (or more) similar target values. It is desired to create a more detailed and subtle summary which generates different target values. The two assignments to existing influential variables which get the same most general result are formalized as s1 and s2. One optional goal is identifying a minimum number of additional variables, such that differentiation between s1 and s2, is achieved. Each benefit rule of an adjudication platform is composed of a group of variables and/or values. This group is typically bigger than the group of variables and/or values of an assignment such as s1 or s2. The variables (influential and/or non-influential) of each assignment (s1 or s2) are extended according to the benefit rule. An arsenal of value combinations for the extended assignments is prepared and compared against the benefit rule. If any of the value combination of the extended assignments can fulfill the benefit rule at stack, that rule is recognized as an exception. Among the recognized exceptions one exception is recognized as the most general rule. The major formula, also referred to herein as "most general rule", may be recognized as the last formula in an ordered set of benefit rules that is satisfied by the extended assignment. As used herein, the term "most general rule" means a benefit rule which is satisfied by the biggest number of value assignments to the variables composing that benefit rule. For example, an influential variable A in a given summary is defined as "Drug is Paracetamol". In the health policy related to this summary there are 3 benefit rules relating to variable A:

1) If A∩⌐B∩C then co-pay=$10
2) If ⌐A∩B∩C then co-pay=$12
3) If ⌐A∩⌐B∩C then co-pay=$15

Where B is defined as "Drug is Ibuprofen" and C is defined as "Drug is generic". The variables B and C are included in the extension. Optional values which will lead to rules 1, 2 and/or 3 to become True are considered. Benefit rule 1 is satisfied if the drug is a generic Paracetamol. Benefit rule 2 is satisfied if the drug is a generic Ibuprofen. Benefit rule 3 is satisfied if the drug is any generic but Paracetamol or Ibuprofen. Since the list of generic drugs is far larger than 2 the most general rule here is benefit rule 3. As in many implementations of health policies the major rule is also the last one to be satisfied by the given assignment. Optionally, the most general rule is recognized as the last logical formula in a set of logical formulas used for computing adjudication target values in an adjudication platform, which may be satisfied by the assignment. Some embodiments of the systems and methods may be used to identify relevant insurance exceptions. Optionally, exceptions identification is performed prior to identifying the major formula. Once a benefit rule is recognized as a general rule it is no longer considered an exception. Then a formula, called alpha, is prepared according to the recognized set of exceptions. Alpha is then decomposed to its components, the literals. The literals are formally noted as $X_{alpha}$. The candidate variables are then deduced from these literals. A selection algorithm is applied to the candidate variables to select sets of additional variables. The additional variables are added to the variables of the original summary to create a larger variable set. The summarization algorithm may be used again to generate a new summary from the larger variable set. The generated summary is then appraised using the objective function of interest to determine which of the additional variable sets produces the most desirable result.

In another embodiment it is desired to differentiate two assignments due to similar overall performance result. For brevity, the following is defined:

V denotes a set of candidate variables;

s1 and s2 denote two different assignments to the influential variables of a summary achieving identical and/or similar overall performance result. s1 and s2 have different value assignments to a subset of influential candidate variables, as described above;

C denotes a constraint;

X1, . . . Xn denote exceptions for s1 (formulas which are not the most general for s1 but are satisfied by s1).

$\neg$ deonotes the logical "NOT" for example, "$\neg$X1", denotes exception X1 is not fulfilled; and Y1, . . . Ym denote exceptions for s2 (the formulas which are not the most general for s2 but are satisfied by s2).

The following formula is constructed:

$$\text{alpha}=(s1 \cap C1 \cap \neg X1 \cap \ldots \cap \neg Xn)+ \\ (s2 \cap C2 \cap \neg Y1 \cap \ldots \cap \neg Ym)$$

This formula is satisfied only by assignments which are an extension of s1 or s2. The extension of s1 and s2 may be performed as follow: s1 and s2 are assignments of influential variables, but alpha contains other candidate variables as well. The full assignment value range of other candidate variables is expanded as recited there above. This formula is not satisfied by any of the exceptions. It is satisfied only by the most general rule.

$X_{alpha}$ denotes a set of literals which satisfy alpha. A literal satisfies alpha if changes to the value of the literal affect the calculated value of alpha for one or more value assignments. Such a literal may be described as an "influencing" variable and/or an "important" variable. In other words, the value of the literal under the assignment satisfies alpha. This definition may be seen as equivalent to minimizing alpha in disjunctive normal form (DNF) and selecting literals which appear in the result.

The subsets of $X_{alpha}$ are considered until a set X is found which causes s1 and s2 to have a different overall performance result upon addition of X's additional variables. A set X may be searched for by passing over the subsets of $X_{alpha}$. X causes s1 and s2 to have different most general results when added to the influential variables of the revised summary.

Optionally, other search, optimization and selection algorithms and/or heuristics may be applied to identify additional variables. Optionally, the subsets of $X_{alpha}$ may be passed in increasing order: single variables, pairs etc. Optionally, the subsets of $X_{alpha}$ are determined by domain specific knowledge. One or more of heuristics for enforcing adjudication variable constraints may be applied to reduce the complexity of the selection. Each subset of candidate variables may be evaluated according to the adjudication variable constraints.

Optionally, differentiating between s1 and s2 is determined by a weighted combination of the major formula and the exceptions, as shown in the following exemplary formula:

$$\text{alpha}=(s1 \cap C1 \cap wgenXgen \cap w1X1 \cap w2X2 \ldots \cap wnXn)+ \\ (s2 \cap C2 \cap wgenXgen \cap w1Y1 \cap w2Y2 \ldots \cap wnYn)$$

where

Xgen denotes the major formula (i.e. most general rule, which fulfills the condition ($\neg X1 \cap \neg X2 \ldots \cap \neg Xn$);

Wgen is the weight of Xgen with respect to a given variable assignment; and

W1, W2 . . . Wn denote weights for exceptions.

Optionally, identifying additional variables is performed by a simulation and a summarization procedure. Multiple simulation value sets are generated in a simulation, such as described above. A summarizing procedure is executed on each simulation value set to find an improved summary according to an objective function. Optionally, a desired number of variables in a set of additional variables is a constraints used to identify additional variable sets. Optionally, a desired financial performance of an appraisal table is a constraints used to identify additional variable sets.

Optionally, the overall size of the subset of candidate variables is a constraints used to identify additional variable sets. Optionally, limitations to relations between candidate variables are constraints used to identify additional variable sets.

Figure 4:
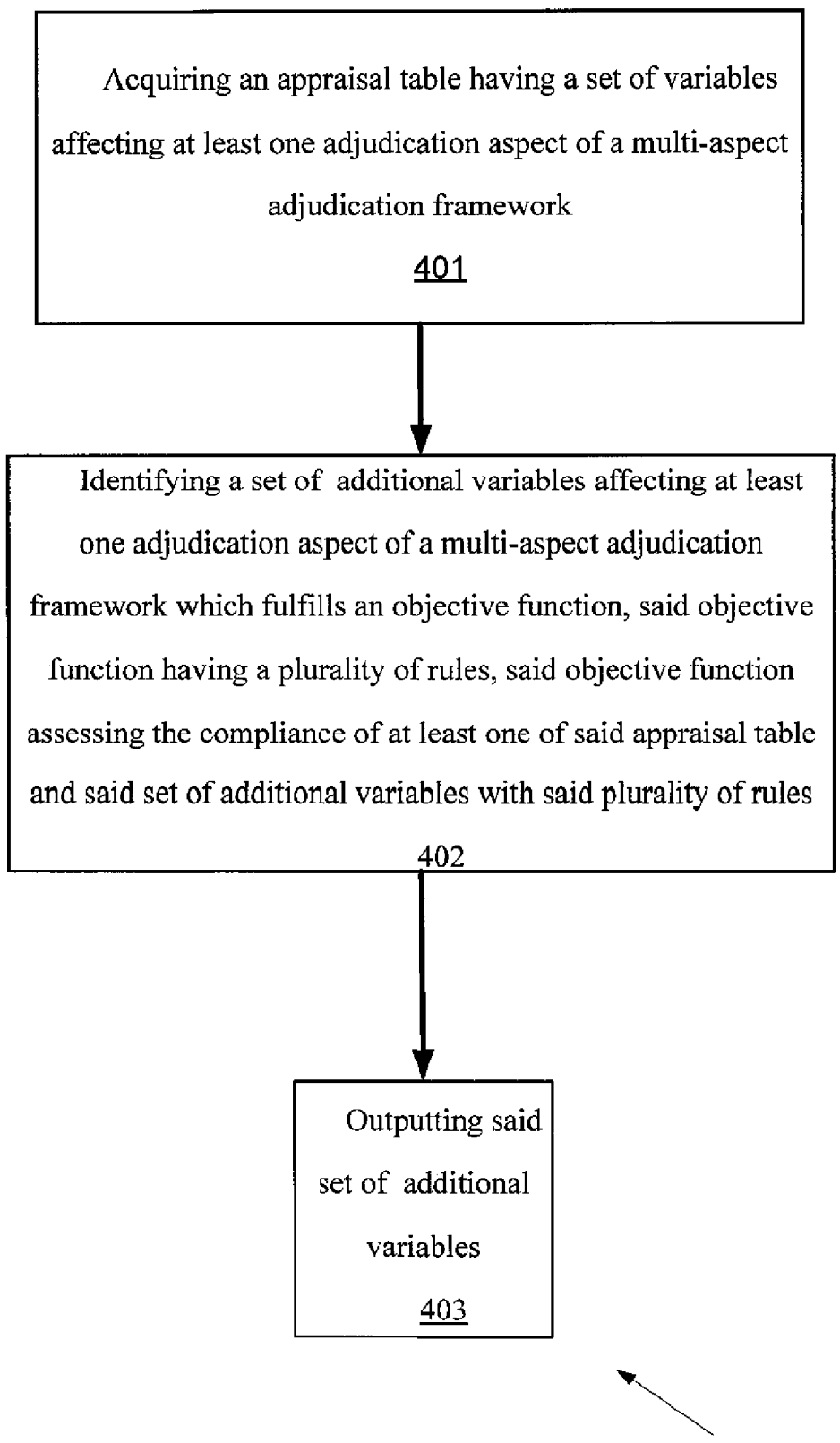
FIG. 4 illustrates a flowchart of a computerized method of identifying additional influential variables in multi-aspect adjudication frameworks, according to some embodiments of the present invention.

Reference is made to FIG. 4, which is a flowchart of a computerized method 400 of identifying additional influential variables in multi-aspect adjudication frameworks, according to some embodiments of the present invention. First, an appraisal table is acquired 401. The appraisal table has a set of variables affecting at least one adjudication aspect of a multi-aspect adjudication framework. The appraisal table may be received, as a file, indicated by a link to a file, scanned from a document, received as a schema, a flow chart, a picture and/or the like. Alternatively, other forms of summary of a multi-aspect adjudication framework may be acquired, such as a decision tree, a flow chart, a scenario description and the likes. Then, a set of additional variables is identified 402. Each variable in the set of additional variables affect at least one adjudication aspect of a multi-aspect adjudication framework. The set of additional variables fulfill an objective function. The objective function is comprised of rules. The objective function is used for assessing the compliance an appraisal table and a set of additional variables with the rules of the objective function. Finally, the set of additional variables is outputted 403.

Optionally, the method 400 comprises an iterative process. For an input adjudication framework summary, additional variables are identified as described in step 402. Then a summarization procedure is applied which narrows down the set of additional variables previously identified. These steps, identifying additional variables and summarizing the newly formed summary, which includes the additional variables, are repeated iteratively until a stop condition is met.

Optionally, the set of additional variables identified in step 402 changes at least one target value in the appraisal table. Optionally, the method 400 is performed automatically. Optionally, the identification step 402 is automatically performed. Optionally, the identification step 402 comprises one or more control points accepting input from a user. The input may modify the objective function. Optionally, the identification step 402 is performed by a satisfiability solver (SAT).

Figure 5:
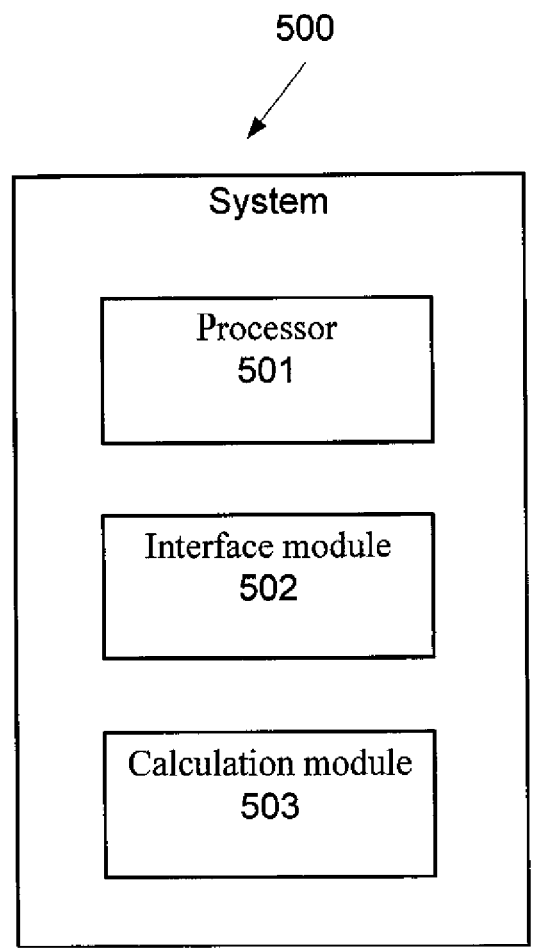
FIG. 5, illustrates a relational view of software and hardware components of a system for identifying additional influential variables in multi-aspect adjudication frameworks, according to some embodiments of the present invention.

Reference is also made to FIG. 5, which is a relational view of software and hardware components of a system 500 for identifying additional influential variables in multi-aspect adjudication frameworks, according to some embodiments of the present invention. The system 500 comprises a processor 501, an interface module 502 and a calculations module. For brevity, it should be noted that computing functions described herein may be performed using the processor 501. The interface module 502 has input and/or output capabilities. The interface module 502 acquires a summary of an adjudication platform as described above. The summary of the adjudication platform may be an appraisal table. For clarity purposes, the rest of the description of the adjudication platform refers to an appraisal table. The appraisal table has a set of variables affecting at least one adjudication aspect of a multi-aspect adjudication framework. The interface module further acquires representation of the multi-aspect adjudication framework. The representation of the multi-aspect adjudication framework is as described above. The calculation module 503 uses the processor 501. The calculation module 503 identifies a set of additional variables affecting at least one adjudication aspect of the multi-aspect adjudication framework. The calculation module 503 further evaluates an objective function. The objective function assesses the appraisal table and/or the set of additional variables. Optionally, the calculation module 503 generates a plurality of simulation value sets. The value sets may be used for identifying additional variables as described in FIG. 3. Optionally, the interface module 502 acquires a summarizing procedure for summarizing a multi-aspect adjudication framework. The summarizing procedure may be provided as source code, a source code project, an executable, text, a file, a reference to a file and the likes. Optionally, the system 500 and method 400 may be implemented as a network design platform, an add-on to an existing network design platform, and/or as a software as a service (SaaS) which provides services for users via client terminals.

The methods as described above are used in the fabrication of integrated circuit chips.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems and methods will be developed and the scope of the terms adjudication frameworks, simplification instructions and appraisal table is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A computerized method of identifying additional influential variables in multi-aspect adjudication frameworks comprising:
   using at least one computerized device, the computerized device including at least one processor in communication with a storage device storing program code for implementation by the processor, to perform the following:
   acquiring an appraisal table having a set of variables affecting at least one adjudication aspect of a multi-aspect adjudication framework;
   identifying a set of candidate variables of a multi-aspect adjudication framework;
   ranking said candidate variables by a pre-defined importance;
   identifying a set of additional variables chosen from said set of candidate variables according to said ranking, said set of additional variables affecting at least one adjudication aspect of a multi-aspect adjudication framework which fulfills an objective function, said objective function having a plurality of rules, said objective function assessing the compliance of at least one of said appraisal table and said set of additional variables with said plurality of rules;
   re-creating said acquired appraisal table according to an updated of said set of variables which include said set of additional variables to achieve greater differentiation in target value entries of said re-created appraisal table as compared to target value entries in original said acquired appraisal table; and
   summarizing said re-created appraisal table to be provided to at least one user via at least one client terminal.

2. The method of claim 1, further comprising acquiring an additional appraisal table and using differentiating between first said appraisal table and said additional appraisal table according to said objective function, using said set of additional variables.

3. The method of claim 1, further comprising:
   identifying data in said appraisal table which is not explained by said set of variables and said set of additional variables;
   identifying a third set of additional variables affecting at least one adjudication aspect of a said multi-aspect adjudication framework which logically infer identified said data.

4. The method of claim 1, wherein said set of additional variables changes at least one target value in said appraisal table.

5. The method of claim 1, wherein said set of additional variables accounts for at least one difference between a plurality of target values in said appraisal table and wherein said at least one difference is not explained by said set of variables.

6. The method of claim 1, wherein said identifying is performed according to a representation of said multi-aspect adjudication framework, said representation comprising of at least one of a plurality of benefit rules and a plurality of formulas for calculating a plurality of adjudication target values in said adjudication framework.

7. The method of claim 1, wherein said identifying is automatically performed.

8. The method of claim 1, wherein said identifying comprises at least one control point accepting input from a user, said input modifying said objective function.

9. The method of claim 1, wherein said identifying is performed by a simulation, said simulation comprising:
   generating a plurality of simulation value sets according to said multi-aspect adjudication framework; and
   executing a summarizing procedure using at least one of said a plurality of simulation value sets.

10. The method of claim 9, wherein said multi-aspect adjudication framework is represented by a plurality of formulas and said generating a plurality of simulation value sets comprises recognizing a major formula of said plurality of formulas.

11. The method of claim 10, further comprising identifying a plurality of adjudication platform exceptions to said major formula and wherein said identifying is performed according to said adjudication platform exceptions.

12. The method of claim 1, wherein said identifying is performed by at least one of a heuristic and an optimization algorithm.

13. The method of claim 1, wherein a variable in at least one of said set of variables and said set of additional variables are Boolean variables which can be assessed as true-or-false.

14. The method of claim 13, wherein a said identifying is performed by a satisfiability solver (SAT).

15. The method of claim 1, further comprising generating a simplified appraisal table of said multi-aspect adjudication framework according to a summarization procedure and said set of additional variables.

16. The method of claim 15, further comprising repeating said identifying a set of additional variables and said generating a simplified appraisal table, iteratively until a stop condition is met.

17. The method of claim 1, further comprising receiving a plurality of adjudication variable constraints which restrict the selection of said set of additional variables and wherein said identifying comprises enforcing said adjudication variable constraints.

18. The method of claim 17, wherein at least one of said plurality of adjudication variable constraints is at least one of a desired number of variables in said set of additional variables and a desired financial performance of said appraisal table.

19. A computer program product for identifying additional influential variables in multi-aspect adjudication frameworks, comprising:
   a non-transitory computer readable storage medium;
   first program instructions to acquire an appraisal table having a set of variables affecting at least one adjudication aspect of a multi-aspect adjudication framework;
   second program instructions to identify a set of candidate variables of a multi-aspect adjudication framework;
   third program instructions to rank said candidate variables by a pre-defined importance;
   fourth program instructions to identify a set of additional variables chosen from said set of candidate variables according to said ranking, said set of additional variables affecting at least one adjudication aspect of a multi-aspect adjudication framework which fulfills an objective function, said objective function having a plurality of rules, said objective function assessing the compliance of at least one of said appraisal table and said set of additional variables with said plurality of rules;
   fifth program instructions to generate a simplified appraisal table of said multi-aspect adjudication framework according to a summarization procedure and said set of additional variables;

sixth program instructions to re-create said acquired appraisal table according to an updated of said set of variables which include said set of additional variables to achieve greater differentiation in target value entries of said re-created appraisal table as compared to target value entries in original said acquired appraisal table; and seventh program instructions to summarize said re-created appraisal table to be provided to at least one user via at least one client terminal;

wherein said first, second, third, fourth, fifth, sixth and seventh program instructions are stored on said non-transitory computer readable storage medium.

20. A system for identifying additional influential variables in multi-aspect adjudication frameworks comprising:
a processor;
an interface module which acquires an appraisal table having a set of variables affecting at least one adjudication aspect of a multi-aspect adjudication framework, and a representation of said multi-aspect adjudication framework; and
a non-transitory computer readable storage medium storing code for execution by said processor, said code comprising:
a calculation module which, includes instructions that identify a set of additional variables chosen from a set of identified candidate variables of a multi-aspect adjudication framework according to a ranking based on a pre-defined importance of said candidate variables, said set of additional variables affecting at least one adjudication aspect of said multi-aspect adjudication framework, evaluates an objective function which assesses at least one of said appraisal table and said set of additional variables, and re-creates said acquired appraisal table according to an updated of said set of variables which include said set of additional variables to achieve greater differentiation in target value entries of said re-created appraisal table as compared to target value entries in original said acquired appraisal table;
wherein said interface module summarizes said re-created appraisal table to be provided to at least one user via at least one client terminal.

21. The system of claim 20, wherein said calculation module generates a plurality of simulation value sets.

22. The system of claim 20, wherein said interface module acquires a summarizing procedure for summarizing a multi-aspect adjudication framework.

* * * * *